Figure 1:
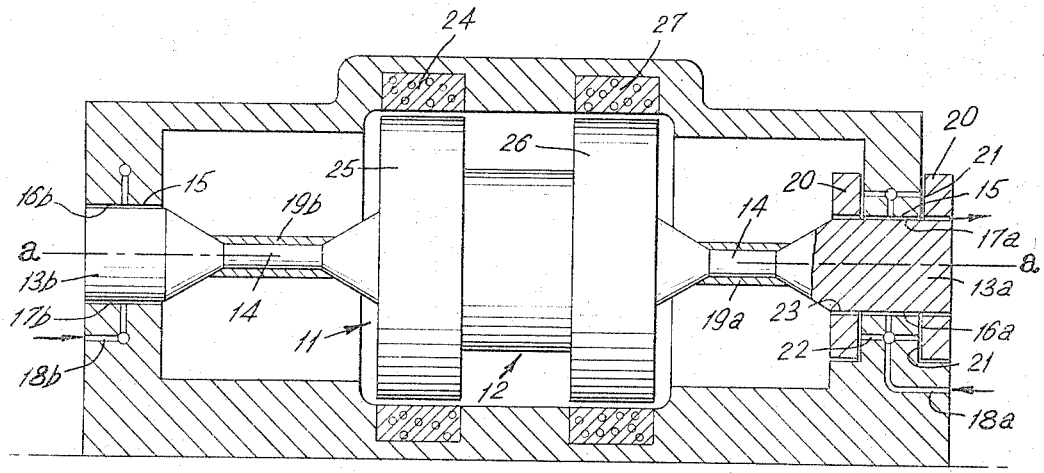

INVENTOR
LESLIE C. KUN

3,326,453
GAS-BEARING ASSEMBLY
Leslie C. Kun, Williamsville, N.Y., assignor to Union
Carbide Corporation, a corporation of New York
Filed Oct. 23, 1965, Ser. No. 503,776
13 Claims. (Cl. 230—116)

This invention relates to gas-lubricated or gas-bearing supported assemblies for rotating members, and is a continuation-in-part application of Ser. Nos. 383,005 and 383,006, both filed July 16, 1964, by L. C. Kun.

It has long been recognized that gas-lubricated bearing systems potentially offer important advantages over liquid-lubricated rotating systems. For example, the latter are limited to relatively low rotational speeds; high speeds cause overheating and failure of the bearing. Liquid systems often present a problem of contamination of the process fluid with lubricant, as for example in food processing machinery. Also, the lubricant itself may become contaminated, such as with radioactive gases in nuclear equipment. Another limitation of liquid-lubricating systems is possible freezeup in low temperature service, e.g. expansion turbines, or chemical decomposition at high temperatures. All of these disadvantages are avoidable in gas-lubricated bearing support systems.

Unfortunately, previously employed gas-bearing systems are plagued with several types of instability phenomena which tend to prevent high speed operation, even if excessive lubricating gas consumption is allowed to provide a stiffer lubricating film.

Two kinds of gas-bearing instabilities are the most troublesome, synchronous whirl and half-frequency or self-excited whirl. The synchronous whirl is due to mechanical unbalance. If the geometric and gravity axes of the rotating member do not coincide, whirling of the geometric axis can be observed as the rotors, especially at higher speeds, tend to rotate about their inertial (gravity) axis. Because the running clearance of a gas-lubricated bearing system is very small (on the order of 0.5–1 mil), the deviation between the two axes must be kept at a very low value. This may not be a particularly serious problem where a simple cylindrical one-piece shaft is supported on two journal bearings, because dynamic or even static balancing is usually sufficient to produce suitably small imbalance. However, most turbo-machinery rotors are quite complex and may consist of numerous pieces. For example, the shaft bearing-impeller system of one commercially used air expansion turbine consists of more than a dozen pieces. Even if the rotor is balanced initially, during operation the various parts may shift their relative position as experimental evidence has proved.

Other causes of synchronous whirl in prior art gas-lubricated bearing support systems include uneven strains on nonisotropic materials, uneven creep rate of highly stressed rotors, uneven erosion of rotor parts by entrained solids in the working fluid, dimensional instability due to aging, and the presence of thermal gradients in the rotor. These effects may combine and cause severe unbalance. To demonstrate the centrifugal forces due to a possible unbalance, a gas-bearing system having a rotor weight of 80 pounds, a shaft speed of 36,000 r.p.m., and an eccentricity of 0.0005-inch will develop an unbalance force of over 1,400 pounds. Obviously, the gas film would not be able to carry this greatly increased load. Seizure between the rotor and bushing would occur.

The other common form of gas-bearing instability, namely half-frequency or self-excited whirl, is induced by the relative velocity between the shaft and bushing or sleeve, and is sustained by the gas film forces therebetween.

The threshold of the circular frequency of the whirl is usually calculated as:

$$\omega = R\sqrt{\frac{k}{m}}$$

where $\omega$ = whirl threshold.
$R$ = whirl ratio. The usual value is 2 or greater. It is considered to be constant for a given gas bearing and rotational speed, but is a function of the system geometry and other factors.
$k$ = spring constant of the lubricating gas film.
$m$ = mass of the rotor.

The half-frequency whirl is very vexing as it usually occurs below the desired operating speed, and the orbiting amplitude increases very suddenly without warning. Limited evidence also suggests that near the critical frequency or self-excited whirl threshold, the gas-lubricated bearing is extremely sensitive to external excitations. In one experiment a slight tap on the bench where the equipment was located was enough to cause immediate seizure of the bearing surfaces.

To avoid these aforementioned difficulties, various remedies have been proposed and tested by the prior art. These include increasing the whirl ratio by breaking up the symmetry of the gas film, as for example with longitudinal grooves, non-circular holes and separate thrust pads. Another approach has been to increase the gas film stiffness by preloading, increasing the shaft diameter, optimizing the radial clearance, and increasing the gas supply pressure. A further method is the use of resonant cavities.

All of these possible remedies have drawbacks. For example, longitudinal grooves tends to decrease the gas film stiffness and most of the other methods increase the lubricating gas consumption to an uneconomically high level. Furthermore, they do not solve the aforementioned instability problems due to synchronous whirl.

It is an object of this invention to provide an improved gas-lubricating bearing assembly which avoids mechanical instabilities of the rotating members.

Another object is to provide an improved gas-lubricated bearing system which eliminates contact between the rotor and its support means due to synchronous whirl and to self-excited or half-frequency whirl in the desired operating range.

A further object is to provide an improved gas-lubricated bearing system with stability at high rotating speeds and yet have relatively low consumption of lubricating gas.

Figure 2:
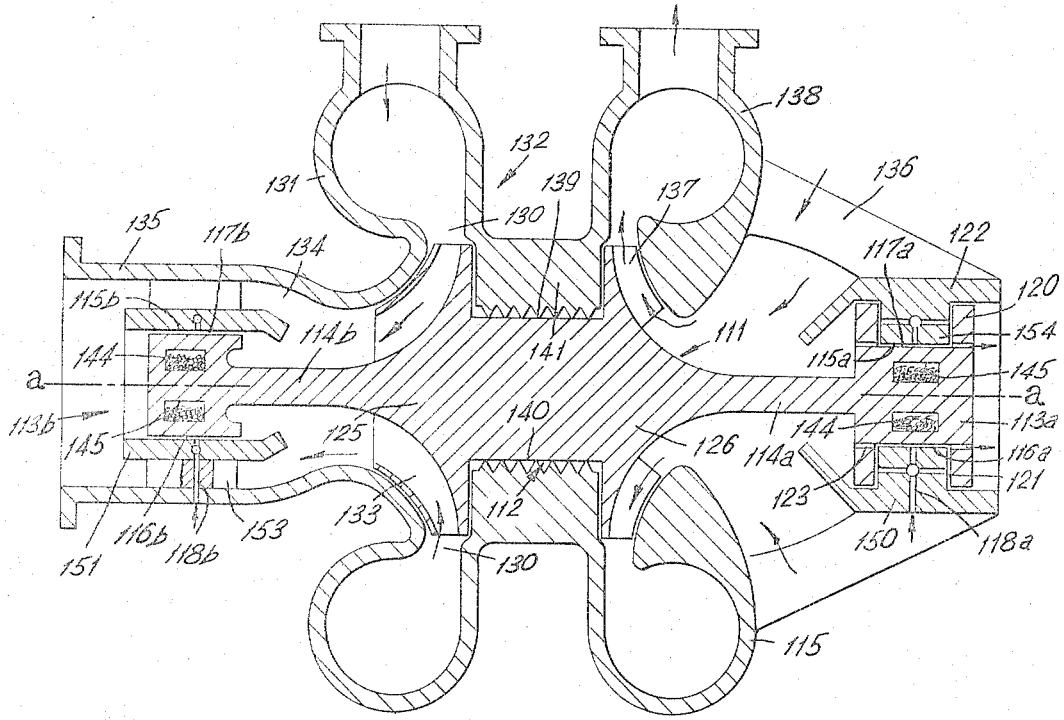

Other objects and advantages will be apparent from the ensuing description, the appended claims and the drawings in which:

FIG. 1 is an elevation view, taken in cross-section, of an electric motor driven-generator assembly constructed in accordance with one embodiment of this invention, and FIG. 2 is an elevation view, taken in cross-section, of a gas turbine driven-compressor assembly constructed according to another embodiment.

In my previously referenced copending application Ser. Nos. 383,005 and 383,006, these objects are accomplished by providing a gas bearing assembly comprising a rotor, elastic support means such as springs, rigid secondary support means such as a frame, and movable primary support means which can be a bearing sleeve or a non-rotating shaft. A narrow annular space is provided between the inner surface of the sleeve and the outer surface of the shaft (where shaft is rotatable) or between the outer surface of the shaft and the walls of a passage through the rotor (where shaft is non-rotating).

I have now discovered that the same objects may be achieved by providing a gas bearing assembly having rotor means including at least two mass portions spaced apart and joined by elastic primary support means. These elastically connected portions are preferably a relatively large torque transferring mass and a relatively small auxiliary mass which assists in providing dynamic stability for the gas bearing assembly. Means are provided for imparting speed at least 2000 r.p.m. to the rotor. A rigid casing secondary support member is positioned with respect to at least the dynamic stabilizing mass portion so as to provide a narrow annular space therebetween having walls substantially concentric and preferably parallel to the axis of rotation. Means are also provided to introduce sufficient gas into the annular space to form a stiff gas film which supports and radially positions the rotor means substantially concentrically with respect to the rigid secondary support member. The assembly also includes means for receiving at least part of the energy of rotation from the rotor means.

Referring now to FIG. 1, rotor assembly 11 includes torque transferring mass portion 12 and dynamic stabilizing mass portions 13a and 13b. It should be understood that mass portions 13a and 13b do not provide dynamic stability by themselves; this stability is imparted by the entire assembly operating in combination. The weight ratio of the toqure transferring mass portion 12 to the dynamic stabilizing mass portion 13a or 13b is preferably at least 10:1 because less dapming is usually required for relatively small dynamic stabilizing masses. These masses are joined by elastic primary support means as for example longitudinal metallic sections 14 of reduced diameter. In this embodiment, elastic support sections 14 comprise a rotatable shaft portion of the rotor means. The entire rotor assembly 11 is supported from casing inner wall 15 as the rigid secondary support member by stiff gas films 16a and 16b. These films are formed in narrow annular spaces 17a and 17b between the adjacent surfaces of small dynamic stabilizing mass portions 13a and 13b, casing inner wall 15 parallel to the axis of rotation a—a. Whereas spaces 17a and 17b are illustrated as parallel to the axis of rotation, the boundary walls may form other configurations such as conical or barrel-shapes, as long as they are circular in cross-section and concentric to the axis. The radial clearance between the rotating small auxiliary masses 13a and 13b and the stationary casing inner wall 15 may be on the order of 0.001 inch. This annular space is preferably between about 0.0002 and 0.008 inch width per inch of bearing diameter, i.e. mass 13a or 13b diameter contiguous to the space. Narrower spaces are more susceptible to being fouled with dirt particles which may cause bearing contact and/or introduce excessive bearing friction losses, and wider spaces may not provide sufficient gas support for the rotor and also require excessive support gas consumption. Borings 18a and 18b are provided in casing 15a for the introduction of a suitable gas, e.g. air or nitrogen, into the respective narrow annular spaces 17a and 17b to lift relatively small dynamic stabilizing masses 13a and 13b off the casing inner wall 15 and form stiff lubricating gas films 16a and 16b, respectively. That is, the outer ends of borings 18a and 18b communicate with a source of gas and the inner ends of these borings communicate with narrow annular spaces 17a and 17b; respectively.

Elongated elastic primary support means 14 joining the torque transferring mass portion 12 and the dynamic stabilizing mass portions 13a and 13b on either side of mass portion 12 along the rotational axis a—a are preferably formed of metal. This is because metals do not undergo substantial change in physical properties and are not subject to chemical decomposition or deformation when exposed to hostile environments such as extreme low (below −50° C.) or extreme high (above 300° C.) temperature levels, or in radioactive environment or strongly acidic or basic conditions. Rubber, plastic, or other elastomeric materials are adversely affected by such environments. Rubber and similar materials are also subject to fatigue and/or aging. In marked contrast, the present assembly provides very close fits between rotor and housings, seals and the like, which do not change during use. The metal selected for construction of the elastic primary support means 14 should be compatible with the intended operating conditions, and preferably possesses a relatively high modulus of elasticity and no measurable creep. Suitable metals include stainless steel, aluminum alloys, titanium and copper bearing alloys such as beryllium-copper.

Under operating conditions, it is preferred that the radial deflection of the elastic support means of the instant gas-bearing apparatus be less than about four times the radial clearance between the rotor and rigid secondary support member. This is because relatively soft elastic supports (such as rubber with a deflection-to-clearance ratio greater than 4) would create shaft seal eccentricity and/or misalignment during operation and prevent maintaining desirably close clearances between moving and stationary parts. Large eccentricities are particularly undesirable because the gas leakage rate through the seals will increase with greater eccentricity. These problems are avoided by the use of metal elastic supports.

It is also preferred that in operation, the stiffness of the elastic primary support means be at least about 0.1 the stiffness of the gas film upon application of a given load normal to the rotor axis. Stated in another manner, the elastic primary support is constructed so as to experience a deflection of ten times or less than the gas film clearance when exposed to the same force. A smaller stiffness ratio of elastic support means to the gas film would occur if soft rubber or other elastomers were employed for construction of the elastic support means, and should be avoided for the above-discussed reasons of shaft seal alignment and close clearances.

The elastic primary support means do not contribute appreciable damping. For any set of design parameters, e.g., mass and stiffness ratios and degree of unbalance, the present bearing system will be stable up to a certain speed without any damping of the support. It has also been established that very high rotating speeds can be reached due to the minor inherent damping only of elastic supports. On the other hand, for rotors having substantial unbalance the resulting vibration amplitudes may be kept small (i.e., less than bearing clearance) by employing separate energy dissipation or damping means in addition to the elastic support means. It was found that separating the elastic support and the damping means allows the optimization of both factors independently. Accordingly, one embodiment of the invention contemplates damping means contiguously associated with the rotor means and separate from the elastic support means. As illustrated in FIG. 1, the damping means may comprise sleeves 19a and 19b surrounding the elongated elastic support members 14 formed of a material which dissipates the energy by intense friction within, as for example elastomers or preferably metals including lead, magnesium and manganese alloys. Another suitable damping means is metal wire wrapped around the reduced diameter elastic support members 14, and metal bonded thereto. Alternatively for larger size rotors, it may be desirable to locate the damping material within the elongated elastic support means 14 as for example by impregnation.

Although the damping means are preferably positioned as illustrated and previously described, such means may alternatively be incorporated within the relatively small dynamic balancing mass portions 13a and 13b of the rotor assembly 11. Such internal damping means are preferably in the form of metal particles having high density and low yield strength, e.g. lead shots partially filling a circular cavity within dynamic stabilizing mass portions 13a and 13b. These are hysteresis-type dampers where the kinetic energy is converted to heat with friction by non-elastic or partially-elastic collisions. Other types of dashpots may also be employed, e.g., the resilient support members may have overlaying telescoping layers, in which case the dissipating mechanism would be the so-called Coulomb friction. The aforementioned damping means are particularly advantageous where the bearing support system is exposed to extreme environmental surrounding, i.e., very low or very high temperature levels. For example, in the FIG. 1 gas bearing assembly, cavities filled with lead shots as the damping means may be provided concentrically positioned with respect to the axis of rotation $a$—$a$ and within the walls of dynamic balancing mass portions 13a and 13b adjoining the casing inner surface 15.

If desired, mass portion 13a which aids in dynamic balancing may be provided with thrust sections 20 to axially position rotor assembly 11. As illustrated, thrust section 20 is integral with dynamic balancing mass portion 13a and extends in a direction normal to the axis of rotation $a$—$a$. The inner surfaces of this section are normal to and join the inner wall of gas bearing space 17a, and positioned with respect to the normal section of the casing inner wall 15 to form a narrow space 21 therebetween of less than about 0.01 inch. Space 21 is preferably between about 0.0002 and 0.008 inch width per inch bearing diameter, as previously discussed. In this manner narrow annular spaces 17a and 21 are in direct communication and normal to each other. Gas is supplied through passageways 18a in the casing wall to branch passageways 22 communicating with narrow space 21 to form a stiff gas lubricating film therein. A portion of this gas exhausts from the assembly to the surrounding environment through passageways 23 preferably uniformly spaced around the base of thrust section 20. Thus, by the use of this gas film and that formed in space 17a, rotor assembly 11 is supported in both the lateral and longitudinal directions. If desired, similar extensions to the other dynamic stabilizing mass portion 13b may be provided to form a corresponding second thrust section, but this is not essential as the thrust forces can be exerted in one direction only.

The gas is preferably supplied to spaces 17a, 17b and 21 in an externally pressurized (above ambient pressure) state to provide a hydrostatic type bearing system. Alternatively, the gas may be provided from the surrounding atmosphere to provide a hydrodynamic bearing system. As is well understood in the art, hydrodynamic systems may be started under friction conditions using, for example, self-lubricated surfaces.

In the FIG. 1 gas bearing assembly, electric energy is received by an electric motor having field coils 24 and imparts a speed of at least 2000 r.p.m. to energy-receiving section 25 of torque transferring mass 12 rotating on axis $a$—$a$. At least part of this energy is transferred by energy-transmitting section 26 of torque transferring mass 12 as electrical energy to field coils 27. Thus, the illustrated embodiment is an electric motor-driven generator.

Alternatively, section 25 may receive energy from a pressurized fluid. This energy may be transferred from the pressurized fluid from energy-receiving section 25 operating as a turbine through torque transmitting mass portion 12 and delivered to field coils 27 of the generator. As used herein, the terms "generator" includes equipment used either for producing useful electrical power or for dissipating the energy by electric means such as eddy current brakes. As a further alternative, electric energy may be received from field coils 24 and transferred by means of the rotating torque transmitting portion 12 to gas entering a compressor through a suction casing. The gas flows through passageways in a compressor in which it is pressurized and leaves through a discharge casing of the compressor. The latter may be in the form of a gas blower or a liquid pump, either of which may for example act to dissipate shaft power as a fluid brake.

FIG. 2 illustrates a turbine-driven compressor unit employing another embodiment of the novel gas bearing support assembly in which elements corresponding to certain elements in the electric motor-driven generator embodiment of FIG. 1 have been identified by same reference number plus one hundred. External energy is supplied in the form of relatively high pressure gas introduced through nozzzles 130 located in the inlet casing 131 of turbine 132 to contact turbine wheel passages 133 of energy-receiving section 125 of torque transferring mass 112. This gas is exhausted at lower pressure through passageway 134 into discharge casing 135. At least part of this energy is transferred by mass 112 through energy-transmitting section 126 to gas entering through compressor suction 136. The gas is pressurized after flowing through rotating passageways 137, and discharged into discharge casing 138. The energy-receiving section 125 and the energy-transmitting section 126 of torque transferring mass portion 112 are separated by shaft sealing means which may comprise a series of tooth-type projections 139 in the annular space between the central recessed portion 140 of mass 112 and the central, inwardly projecting section 141 of casing 115. Circular projections 139 may form part of section 141 and provide a labyrinth-type seal against the rotating portion 140.

Rotor assembly 111 includes the previously described relatively large torque transferring mass portion 112 and relatively small dynamic stabilizing mass portions 113a and 113b. These masses are joined by reduced diameter metallic sections 114a and 114b, respectively, as elastic primary support means. The entire rotor assembly 111 is supported from the casing inner walls 115a and 115b as the rigid secondary support member by stiff gas films 116a and 116b, respectively. These films are formed in narrow annular spaces 117a and 117b between the adjacent surfaces of small dynamic stabilizing mass portions 113a and 113b, and the respective sections of the casing inner wall, parallel to the axis of rotation $a$—$a$.

End section 150 of casing 115 forms a wall portion of compressor suction casing 136, and opposite end section 151 is positioned within turbine discharge casing 135 by spaced support members 153. The small dynamic stabilizing mass portion 113a is provided with thrust sections 120 extending normal to the axis of rotation $a$—$a$. These sections are sized so as to form narrow spaces 121 between their inner surfaces and the normal surfaces of raised, inwardly extending annulus portion 154 of casing end section 150. In this manner narrow annular spaces 117a and 121 are in direct communication and normal with each other. Gas is supplied to and discharged from normal annular spaces 117a, 117b and 121 in a manner analogous to annular space 21 of the FIG. 1 embodiment. Specifically, gas is supplied through drillings 118a and 118b in the casing walls to bearing spaces 117a and 121 and to space 117b to form a stiff gas lubrication film therein. This gas exhausts from space 117a to the surrounding environment through passageways 123 which are preferably uniformly spaced around the base of thrust section 120.

Separate damping means are provided in the form of metal particles 144 partially filling cavities 145 in auxiliary mass portions 113a and 113b. In operation these metal particles 144 collect uniformly at the outer periphery of the cavities 145 due to centrifugal force. Whenever the rotor is rotating around its axis $a$—$a$, the particles 144 will be stationary relative to the rotor. However, as soon as the rotor axis itself starts to obrit within the bearing clearances 117a and 117b resulting in superimposed rotational and whirling motions, the particles 144 will move relative to the rotor and will extract energy by non-elastic or partially-elastic collisions. Cavities 145 are preferably torus-shaped for substantially equal distribution around the periphery to minimize unbalance problems.

Although preferred embodiments have been described in detail, it will be recognized that obvious modifications and variations may be practiced without departing from the spirit and scope of the invention.

For example, two bearings will usually be used to elastically support a shaft, but one bearing may be used in a cantilevered arrangement, or three or even more bearings may be used to support a particular design rotor. Also, if desired, the rotor may be oriented in a substantially vertical postion with the thrust bearing usually located at the lower end.

What is claimed is:

1. A gas bearing assembly comprising:
   (a) rotor means comprising a torque transferring mass portion and a dynamic stabilizing mass portion joined by elastic primary support means;
   (b) means for imparting speed of at least 2000 r.p.m. to said rotor means;
   (c) a rigid casing secondary support member positioned with respect to said dynamic stabilizing mass portion so as to provide a narrow annular space therebetween having walls substantially concentric to the axis of rotation;
   (d) means for introducing sufficient gas into said annular space to form a stiff gas film which supports and radially positions the dynamic stabilizing mass portion substantially concentrically with respect to said rigid casing secondary support member; and
   (e) means for receiving at least part of the energy of rotation from said rotor means.

2. A gas bearing assembly according to claim 1 in which the weight ratio of the torque transferring mass portion to the dynamic stabilizing mass portion is at least 10:1.

3. A gas bearing assembly according to claim 1 in which said means (d) introduce gas into said narrow annular space at super ambient pressure.

4. A gas bearing assembly according to claim 1 in which a longitudinal metallic section of reduced diameter comprises said elastic support means.

5. A gas bearing assembly according to claim 1 in which damping means are provided in contiguous relation with said rotor means and separate from said elastic primary support means.

6. A gas bearing assembly according to claim 1 in which a longitudinal metallic section of reduced diameter comprises said elastic support means, and damping sleeve means are concentrically positioned around such section.

7. A gas bearing assembly according to claim 1 in which relatively small dynamic stabilizing mass portions are positioned on opposite sides of a relatively large torque transferring mass portion and joined thereto by said elastic primary support means to form said rotor means (a).

8. A gas bearing assembly according to claim 1 in which a thrust bearing section is provided at one end of said rotor means and positioned with respect to said rigid casing secondary support member so as to form a second narrow annular space therebetween having walls substantially normal to the axis of rotation, and means are provided for introducing sufficient gas into the second annular space to form a stiff second gas film transmitting the thrust load from said rotor means to said rigid casing secondary support member.

9. A gas bearing assembly according to claim 8 in which damping means are provided in contiguous relation with said rotor means and separate from said elastic primary support means.

10. A gas bearing assembly according to claim 1 in which the stiffness of said elastic primary support means is at least 0.1 the stiffnes of said gas film.

11. A gas bearing assembly according to claim 1 in which the radial deflection of said elastic primary support means is less than about four times the width of said annular space between said dynamic stabilizing mass portion and said rigid casing secondary support member.

12. A gas bearing assembly comprising:
   (a) rotor means comprising a relatively large torque transferring mass portion and two relatively small dynamic stabilizing mass portions positioned on opposite sides of the large mass portion and at opposite ends of said rotor means being respectively joined to said large mass portion by reduced diameter longitudinal metallic sections as elastic primary support means;
   (b) means for imparting speed of at least 2000 r.p.m. to said rotor means;
   (c) a casing enclosing said rotor means being arranged and positioned with respect to the outer surface of said small dynamic stabilizing mass portions to provide first narrow annular spaces of between about 0.0002 and 0.008 inch width per inch diameter of said dynamic stabilizing mass portions therebetween having walls substantially parallel to the rotor means axis of rotation;
   (d) a thrust bearing section at one end of said rotor means as an integral part of said small dynamic stabilizing mass portion and positioned with respect to the adjacent end of said casing (c) so as to form a second narrow annular space of between about 0.0002 and 0.008 inch width per inch diameter of said dynamic stabilizing mass portion, therebetween having walls substantially normal to the rotor means axis of rotation;
   (e) means for introducing sufficient gas into said first annular spaces to form stiff gas films which support and radially position said small dynamic stabilizing mass portions substantially concentrically within said casing (c);
   (f) means for introducing sufficient gas into said second annular space to form a stiff gas film transmitting the thrust load from the small dynamic stabilizing mass portion of said rotor means to said casing; and
   (g) means for receiving at least part of the energy of rotation from said rotor means.

13. A gas bearing assembly according to claim 12 in which a gas turbine comprises said means for imparting speed of at least 2000 r.p.m. to said rotor means, and a gas compressor comprises said means for receiving at least part of the energy of rotation from said rotor means.

References Cited

UNITED STATES PATENTS

| | | | |
|---|---|---|---|
| 1,906,715 | 5/1933 | Penick | 308—9 |
| 3,097,167 | 7/1963 | Beyerle | 308—9 |

MARTIN P. SCHWADRON, *Primary Examiner.*

FRANK SUSKO, *Examiner.*